(12) United States Patent
Schaal et al.

(10) Patent No.: US 6,711,685 B1
(45) Date of Patent: Mar. 23, 2004

(54) SYSTEM AND PROCEDURE FOR PROTECTION AGAINST THE ANALYTICAL ESPIONAGE OF SECRET INFORMATION

(75) Inventors: Albert Schaal, Tuebingen (DE); Helmut Scherzer, Tuebingen (DE); Michael Schilling, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/327,883

(22) Filed: Jun. 8, 1999

(30) Foreign Application Priority Data

Jul. 17, 1998 (DE) .......................... 198 31 884

(51) Int. Cl.[7] .................. G06F 17/60; G06F 12/14; G06F 11/30; H04K 1/100; H04L 9/00; H04L 9/32

(52) U.S. Cl. .................. 713/200; 705/51; 705/52; 705/65; 705/66; 713/165; 713/193; 713/194

(58) Field of Search .................. 713/193; 705/57, 705/51, 52, 65, 66, 67; 380/1

(56) References Cited

U.S. PATENT DOCUMENTS

| | | |
|---|---|---|
| 4,879,645 A | 11/1989 | Tamada et al. |
| 5,014,311 A | 5/1991 | Schrenk |
| 5,296,687 A | 3/1994 | Geronimi |
| 5,550,919 A | 8/1996 | Kowalski |

FOREIGN PATENT DOCUMENTS

JP 10069435 * 3/1998 .......... G06F/12/14

* cited by examiner

Primary Examiner—Thomas R. Peeso
Assistant Examiner—Abdulhakim Nobahar
(74) Attorney, Agent, or Firm—William A. Kinnaman, Jr.

(57) ABSTRACT

The invention presented describes a system and procedure for protecting against the espionage of secret information. A counter is allocated to each secret piece of information, in particular codes. The counter counts the number of uses of the secret information. In this, the counter is set to a starting value. Each use of the secret data element increases the counter state by a defined value. If the counter state reaches a maximum value, the use of the secret data element will be blocked. The blocking of the secret information can, however, be avoided if a defined event occurs before the maximum value of the counter is reached which automatically resets the counter state to its starting value. Any technical, economic or organisational condition can be defined as an event. Particular advantages of the invention presented are that each code can have its own counter allocated to it. In this way, different numbers of uses can be established for each code with regard to its function. As a chip card can contain any number of codes for the most widely differing applications, the block is limited solely to the application affected. The use of the chip card is not therefore blocked as a whole. The events can be easily adapted to the widest range of security and user requirements of the respective application area.

15 Claims, 1 Drawing Sheet

| Events | Protected data elements in the chip card (e.g. codes) | | | | | | | |
|---|---|---|---|---|---|---|---|---|
| | S1 | | S2 | | S3 | | Sn | |
| | count | reset | count | reset | count | reset | count | reset |
| E1 | X | | | | X | | | |
| E2 | | X | | | | X | | |
| E3 | | | X | | | X | X | |
| E4 | | | | | | | | X |
| En | | | | X | | | | |

SYSTEM AND PROCEDURE FOR PROTECTION AGAINST THE ANALYTICAL ESPIONAGE OF SECRET INFORMATION

BACKGROUND OF THE INVENTION

1. Field of the Invention

The invention presented describes a system and procedure for protecting against analytical espionage of secret information on electronic devices, in particular chip cards.

2. Description of the Related Art

Secret codes are stored on chip cards. These are used to protect access to functions and data which are relevant to security. In this, non-coded data is converted into coded data by means of a secret code.

To encode and decode, one or two codes are needed. If the spy, for example, finds out the secret code of an encoding algorithm, then he will be able to decode the encoded and thus protected data, to find out the content of the data and to change it if required.

There are many procedures to find out the codes on a chip card. One of these procedures involves finding out the codes using monitoring techniques specially developed for this. In this, as many encoding operations as possible are initiated in order to be able to find out the codes from the monitored information. In doing so, the analysis of the secret data is carried out using measurements, for example, of the current supply to the chip card. These measurements are, however, superimposed with noise. This requires the continually repeated use of the code, in order to be able to filter out the superimposed noise.

Safety precautions against this type of monitoring measure basically consist of the codes having to be protected against monitoring. There are several procedures for this using the current state of the art.

In one protection procedure, the chip card contains a fault counter. The fault counter starts to count if the chip card establishes a faulty use of the code, e.g. a mis-hit authentication using the wrong code. When the fault counter reaches a certain limit, further use of the code or the chip card is blocked.

One disadvantage of this procedure is that only faulty use is counted. Fault-free use is not counted. Therefore, this procedure cannot protect from attacks which find out the codes through fault-free use of modern monitoring techniques. This particularly affects the espionage of secret information by authorised users.

The German patent DE 19506921 describes such a procedure for a mobile data carrier, in particular a chip card. The mobile data carrier communicates with a data input and output device. The secret data which is entered into the data input and output device is compared to the secret data stored on the chip card. If the comparison detects a fault, then the counter counts upwards. After a certain number of faulty attempts, any continued use will be blocked automatically.

Another protection mechanism consists of limiting the number of uses of a code through a use counter. In this, valid uses are also counted. One disadvantage of this design is that in the case of too small a number of permitted uses being set, the card can also be blocked for authorised use, and in the case of too large a number of uses being set, the card and/or the code can be spied using analytical methods.

The Japanese patent 10069435 describes one such mechanism which counts, by means of a counter, the operations executed after activation of the card and which blocks the card on the maximum value being exceeded.

It is therefore an object of the present invention to provide a procedure and system for protection against espionage of secret information which avoid the disadvantages of the above-stated procedures.

SUMMARY OF THE INVENTION

This object is achieved by the present invention, as defined in the appended claims. The preferred design forms of the invention presented can be found in the subclaims.

One aspect of the present invention contemplates a procedure for protecting against analytical espionage of secret information. In accordance with this aspect of the invention, a counter is allocated to the secret information to establish the number of uses of the secret information. After it is set to a starting value, the counter value is increased by a defined value on each use of the secret information. The incrementing step may be repeated until either a defined event occurs or a defined maximum value is reached. The counter is reset to the starting value (which may be a new starting value) when the defined event occurs. On reaching the defined maximum value, the use of the secret information is blocked.

The use of the secret information may be unblocked on the presentation of a defined event and the counter value reset to the starting value.

Several secret pieces of information may be allocated to a counter. The event may be any technical, economic or organisational condition which can be accessed by the presence of a yes/no decision, and may consist of one or more part events which are combined with one another using an AND or OR function.

The same event may be allocated to different counters. The occurrence of an event in different counters may cause an increase in the counter value. Also, the occurrence of an event may lead to an increase in the counter value in one counter and to the resetting of the counter value to the starting value in another counter.

The secret information may be a code for encoding data, which may be stored in a chip card. The secret information may also be a secret function for executing safety-relevant operations on the chip card.

In another aspect, the present invention contemplates an electronic device for storing and processing secret information containing the procedure described above. The electronic device may be a chip card or security module.

In yet another aspect, the present invention contemplates a data carrier containing a program for executing the procedure described above.

The advantages of the present invention are that by automatically resetting the counter to its starting point on the entry of a defined event, an additional re-initialization through offices authorised for this becomes unnecessary. As each code can have its own allocated counter, different numbers of uses can be established for each code with regard to its function. As a chip card can contain any number of codes for the most widely varied applications, the block is only limited to the affected application.

The use of the chip card is therefore not blocked as a whole. The events allow different security and user requirements simply to be tailored to the respective application area.

The invention presented will be described in greater detail using a preferred design example in connection with drawings, which show the following:

DESCRIPTION OF THE PREFERRED EMBODIMENT

Figures 1, 2:
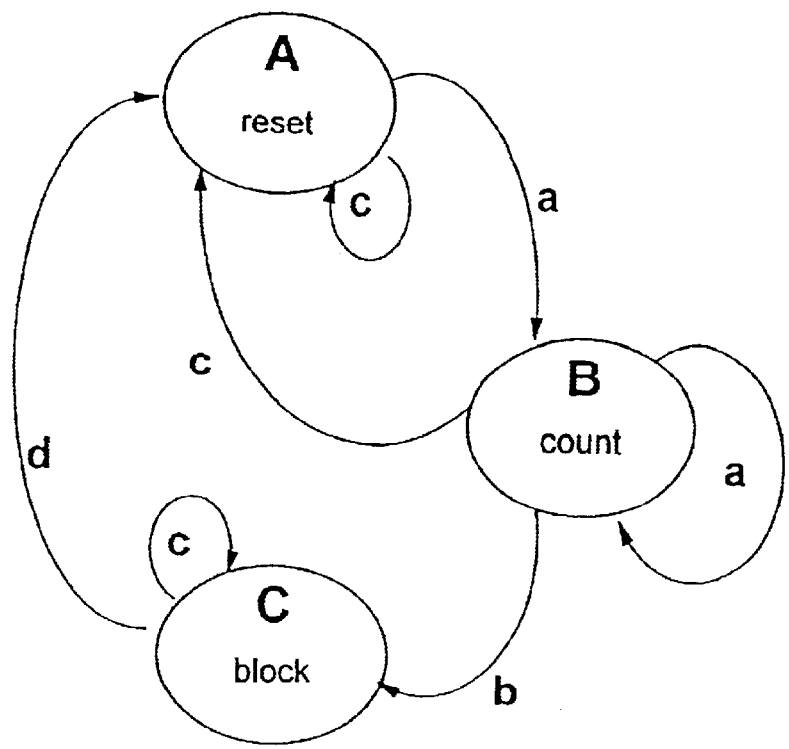
FIG. 1 is a state chart of the invention presented.
FIG. 2 is a table with possible combinations between events and codes according to the invention presented.

FIG. 1 describes, in the form of a state chart, the invention presented using a counter for counting the uses of a protected data element or secret information, particularly a code.

The starting position (A) of the counter has a defined starting value (A). This value is increased by a certain value (state B of the counter) on each occurrence of a defined event (a), for example the use of a code. If the counter value exceeds a certain defined maximum value (end state C of the counter) through the entry of a certain event (b), then access to the code is blocked. The function protected by the code can no longer be executed. For each code there exists a defined event (c) which resets the counter to the starting state (A) at the defined starting value.

If this event (c) occurs, then as long as the end state (C) has not yet been reached, the counter will be reset automatically to the starting state. A possible additional design variant can be that after access is blocked, the event (d) resets the counter to its starting value and releases access to the code. The event can be selected independent of the number of uses of the code. In this way the event can, for example, be a successful authentication using another code.

The event can therefore be triggered by any definable condition which can be checked and stored internally in the card.

An event can also consist of several part events which exist in a AND or OR or NOT logic. In this way, for each code a certain event or a certain number of events can be defined which fulfil the specific security and user requirements of a special chip card. The same event can also be allocated to several codes with different effects. The possibilities which exist here can be seen in the drawing following FIG. 2.

Using a table, FIG. 2 describes a selection of possible design examples for the invention presented. Using events E1, E2, E3, E4 and En, and codes S1, S2, S3 and Sn, the most common possible combinations of events and codes or their allocated counters are shown and explained. The events E1, E2, E3, E4 and En are allocated to the codes S1, S2, S3 and Sn in an established manner. An event can be any clearly definable condition which can refer, for example, to the number of uses of a code. The event can, however, also refer to any other selected technical or other condition. In any case, the entry of an event triggers a change of state in a counter. The change in state of the counter can result in the code being blocked.

Event E1, for example, is allocated to codes S1 and S3 in such a way that on the entry of event E1, the counters of the codes respectively count up by a defined value. Event E2 is allocated to codes S1 and S3 in such a way that the counters allocated to these codes are reset to a starting value on the entry of event E2. Events E3 and E4, for example, are allocated to code S2 in an AND logic where when both events occur, the counter for code S2 is counted up by a certain value.

In addition, event E3 is allocated to codes S3 and Sn respectively in such a way that on the entry of the event E3, the counter of code S3 is reset to its starting value and the counter of code Sn is counted up by a certain value.

Event E4 is allocated to code Sn in such a way that when this event occurs, the counter of the code is reset to its starting value even if the result En has occurred.

Finally, the event En is allocated to both codes S2 and Sn in such a way that on the event En occurring, the counter of code S2 is reset to its starting value.

Particular areas of application for the invention presented include patient chip cards, chip card stocks and access control chip cards. These cards must be protected in particular against the authorised user using them for the espionage of secret information.

In the case of electronic stock cards, there is the danger that the authorised user frequently initializes the use of the code through small deductions, for example of 1 penny, in such a way that the code can be established using analytical monitoring procedures. This should be avoided with the invention by each deduction increasing the counter state by a certain value and on reaching a maximum value the card is blocked if previously no event occurs to reset the counter to its starting value. This event can, for example, be a test procedure by the bank which, for example, on loading the electronic stock compares the deduction record of the card holder with statistical values experienced by the bank.

Another area is access control in buildings. Even here there is a risk that through frequent passing of an access check using an access chip card, the codes can be worked out using analytical methods. Even for this, a certain control facility is offered by a counter with a defined maximum value. Resetting the counter can, for example, be carried out by an authorised office, such as security guards at the gates. The resetting of the counter can be linked to an event which corresponds to the behaviour of the card holder to a certain average taken from experience.

The invention presented can be applied, in particular, to chip cards. In addition, the invention can also be used in any electronic device which contains secret information or secret functions. Of note are car and door keys with security modules or clocks with security modules.

What is claimed is:

1. A procedure for protecting against analytical espionage of secret information, comprising the steps of:

a) allocating a counter to the secret information to establish by means of a counter value a number of uses of the secret information;

b) setting the counter value to a starting value;

c) increasing the counter value by a defined value on each use of the secret information independently of the validity of such use;

d) resetting the counter value to the starting value when a first defined event occurs;

e) blocking the use of the secret information on reaching a defined maximum value; and f) unblocking the use of the secret information on presentation of a defined event and resetting the counter value to the starting value.

2. A procedure according to claim 1 in which the starting value under step d) is a new starting value.

3. A procedure according to claim 1 in which step c) is repeated until either the defined event under step d) occurs or the defined maximum value under step e) is reached.

4. A procedure according to claim 1 in which several secret pieces of information are allocated to a counter.

5. A procedure according to claim 1 in which an event is able to be any technical, economic or organisational condition which can be accessed by the presence of a yes/no decision.

6. A procedure according to claim 1 in which an event consists of one or more part events which are combined with one another using an AND or OR function.

7. A procedure according to claim 1 in which a single event is allocated to different counters.

8. A procedure according to claim 7 in which an occurrence of an event in different counters causes an increase in the counter value of each such counter.

9. A procedure according to claim 7 in which an occurrence of an event leads to an increase in the counter value in one counter and to a resetting of the counter value to the starting value in another counter.

10. A procedure according to claim 1 in which the secret information is a code for encoding data.

11. A procedure according to claim 1 in which the secret information is a secret function for executing safety-relevant operations on a chip card.

12. A procedure according to claim 1 in which the code is stored in a chip card.

13. An electronic device for storing and processing secret information containing a procedure according to claim 1.

14. A device according to claim 13 in which the electronic device is a chip card or security module.

15. A data carrier containing a program for executing the procedure according to claim 1.

* * * * *